(12) United States Patent
Barlas

(10) Patent No.: US 10,397,527 B2
(45) Date of Patent: Aug. 27, 2019

(54) REMOTELY CONTROLLED ROBOTIC SENSOR BALL

(71) Applicant: Omar Barlas, Fort Worth, TX (US)

(72) Inventor: Omar Barlas, Fort Worth, TX (US)

( * ) Notice: Subject to any disclaimer, the term of this patent is extended or adjusted under 35 U.S.C. 154(b) by 171 days.

(21) Appl. No.: 15/206,153

(22) Filed: Jul. 8, 2016

(65) Prior Publication Data

US 2017/0010607 A1 Jan. 12, 2017

Related U.S. Application Data

(60) Provisional application No. 62/247,694, filed on Oct. 28, 2015, provisional application No. 62/189,834, filed on Jul. 8, 2015.

(51) Int. Cl.
| | |
|---|---|
| *G05D 1/00* | (2006.01) |
| *H04N 7/18* | (2006.01) |
| *A63H 33/00* | (2006.01) |
| *G08B 21/18* | (2006.01) |
| *H04N 5/225* | (2006.01) |
| *H04N 5/232* | (2006.01) |

(52) U.S. Cl.
CPC ........... *H04N 7/185* (2013.01); *A63H 33/005* (2013.01); *G05D 1/0038* (2013.01); *G08B 21/182* (2013.01); *H04N 5/2252* (2013.01); *H04N 5/23219* (2013.01)

(58) Field of Classification Search
CPC .. G05D 1/0038; H04N 7/185; H04N 5/23219; H04N 5/2252; A63H 33/005; G08B 21/182
See application file for complete search history.

(56) References Cited

U.S. PATENT DOCUMENTS

| | | | | |
|---|---|---|---|---|
| 8,571,781 | B2 * | 10/2013 | Bernstein | ............... A63H 30/04 440/6 |
| 9,114,838 | B2 | 8/2015 | Bernstein et al. | |
| 9,150,263 | B2 | 10/2015 | Bernstein et al. | |
| 9,193,404 | B2 | 11/2015 | Bernstein et al. | |
| 9,211,920 | B1 | 12/2015 | Bernstein et al. | |
| 9,218,316 | B2 | 12/2015 | Bernstein et al. | |
| 9,290,220 | B2 | 3/2016 | Bernstein et al. | |
| 9,395,725 | B2 * | 7/2016 | Bernstein | ............. G05D 1/0088 |

(Continued)

OTHER PUBLICATIONS

Stan Schroeder, LG's ball-shaped robot can amuse your cat with a laser, Feb. 21, 2016, http://mashable.com/2016/02/21/lg-rolling-bot/#nBRISA6pLEqj 1 page, Barcelona.

*Primary Examiner* — Thomas Ingram

(57) ABSTRACT

A remotely controlled robotic sensor ball and method of operation thereof. The robotic sensor ball includes an outer shell forming a ball, control circuitry positioned within the outer shell, a camera operably connected to the control circuitry, a propulsion system inside the outer shell, and one or more connectors. The control circuitry includes at least one processor, memory, and a wireless communication interface. The camera is configured to generate video signals of a view exterior to the outer shell. The propulsion system configured to cause the outer shell to rotate in response to instructions received via the wireless communication interface. The one or more connectors are configured to operably connect one or more sensors to the control circuitry. The one or more sensors are connectable in a modular manner.

20 Claims, 6 Drawing Sheets

(56) References Cited

U.S. PATENT DOCUMENTS

| | | | | |
|---|---|---|---|---|
| 2012/0127329 A1* | 5/2012 | Voss | H04N 5/23219 | 348/208.4 |
| 2012/0173047 A1* | 7/2012 | Bernstein | A63H 30/04 | 701/2 |
| 2013/0250047 A1* | 9/2013 | Hollinger | H04N 5/2252 | 348/36 |
| 2013/0265450 A1* | 10/2013 | Barnes, Jr. | H04N 5/77 | 348/207.1 |
| 2014/0238762 A1* | 8/2014 | Berberian | G05D 1/0038 | 180/167 |
| 2014/0324271 A1* | 10/2014 | Oh | G05B 15/00 | 701/28 |
| 2015/0175202 A1* | 6/2015 | MacGregor | G05D 1/0011 | 701/2 |
| 2016/0006922 A1* | 1/2016 | Boudreau | H04N 5/23206 | 348/207.1 |
| 2016/0019737 A1* | 1/2016 | Stagg | G07C 9/00111 | 340/5.61 |
| 2018/0035074 A1* | 2/2018 | Barnes, Jr. | H04N 5/772 | |

\* cited by examiner

REMOTELY CONTROLLED ROBOTIC SENSOR BALL

CROSS-REFERENCE TO RELATED APPLICATION(S) AND CLAIM OF PRIORITY

This application claims priority under 35 U.S.C. § 119(e) to U.S. Provisional Patent Application Ser. No. 62/189,834 filed on Jul. 8, 2015 and U.S. Provisional Patent Application Ser. No. 62/247,694 filed on Oct. 28, 2015. The above-identified provisional patent applications are hereby incorporated by reference in their entirety.

TECHNICAL FIELD

The present disclosure relates generally to robotic sensor devices. More particularly, the present disclosure relates to a remotely controlled robotic ball having a modular design.

BACKGROUND

Robotic balls can move in a nearly any direction. However, their use has been primarily limited to toys.

SUMMARY

Embodiments of the present disclosure provide a remotely controlled robotic sensor ball.

In one embodiment, an apparatus is provided. The apparatus includes an outer shell forming a ball, control circuitry positioned within the outer shell, a camera operably connected to the control circuitry, a propulsion system inside the outer shell, and one or more connectors. The control circuitry includes at least one processor, memory, and a wireless communication interface. The camera is configured to generate video signals of a view exterior to the outer shell. The propulsion system configured to cause the outer shell to rotate in response to instructions received via the wireless communication interface. The one or more connectors are configured to operably connect one or more sensors to the control circuitry. The one or more sensors are connectable in a modular manner.

In another embodiment, a method for operating a robotic sensor ball is provided. The method includes identifying, using control circuitry of the robotic sensor ball, obstacles in an indoor environment based on video signals generated by a camera and outputs one or more sensors while the robotic sensor ball is moving in the indoor environment. The camera and the one or more sensors are operably connected to the control circuitry of the robotic sensor ball. The control circuitry includes at least one processor, memory, and a wireless communication interface. The control circuitry is positioned within an outer shell of the robotic sensor ball. The method includes moving the robotic sensor ball by causing, by a propulsion system inside the outer shell, the outer shell to rotate in response to instructions received via the wireless communication interface. The method includes using, by the control circuitry, a mapping of the indoor environment to control movement of the robotic sensor ball within the indoor environment. The mapping is generated based on the identified obstacles.

In yet another embodiment, a robotic sensor ball is provided. The robotic sensor ball includes an outer shell forming a ball, control circuitry positioned within the outer shell, a camera operably connected to the control circuitry, a propulsion system inside the outer shell, and one or more sensors operably connected to the control circuitry. The control circuitry includes at least one processor, memory, and a wireless communication interface. The camera is configured to generate video signals of a view exterior to the outer shell. The propulsion system is configured to cause the outer shell to rotate. At least some of the one or more sensors connected in a modular manner. The at least one processor is configured to identify obstacles in an indoor environment based on the video signals generated by the camera and outputs of at least some of the one or more sensors while the robotic sensor ball is moving in the indoor environment and use a mapping of the indoor environment to control movement of the robotic sensor ball within the indoor environment. The mapping is generated based on the identified obstacles. The at least one processor is configured to identify an occurrence of an event or sequence of events and control the robotic sensor ball to perform an action in response to identification of the occurrence of the event or sequence of events.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The various figures and embodiments used to describe the principles of the present disclosure in this patent document are by way of illustration only and should not be construed in any way to limit the scope of the present disclosure. Those skilled in the art will understand that the principles of the present disclosure may be implemented in any type of suitably-arranged device or system.

Embodiments of the present disclosure recognize that security systems, IP cameras and remote monitoring systems are limited to one area, one region or specific room of the building and intensive work is required to setup those devices, sensors and cameras throughout an entire building, house or office. Accordingly, embodiments of the present disclosure provide various sensors and a camera in a robotic sensor ball, that user can drive from room to room and monitor the premises remotely. This robotic sensor ball is an internet connected smart ball that can be used to stream live video, temperature, humidity, air quality information and motion alerts to a user's phone, or tablet, while at the same time user can drive the ball from one place to another from within a software application. This robotic sensor ball be used to send notifications and alerts to a user device as the detects any motion, or change in temperature, humidity or air quality, while recording all of the video, audio and sensor data on secure cloud storage. The robotic sensor ball is also modular allowing for addition and removal of various sensors and outputs.

Figure 1:
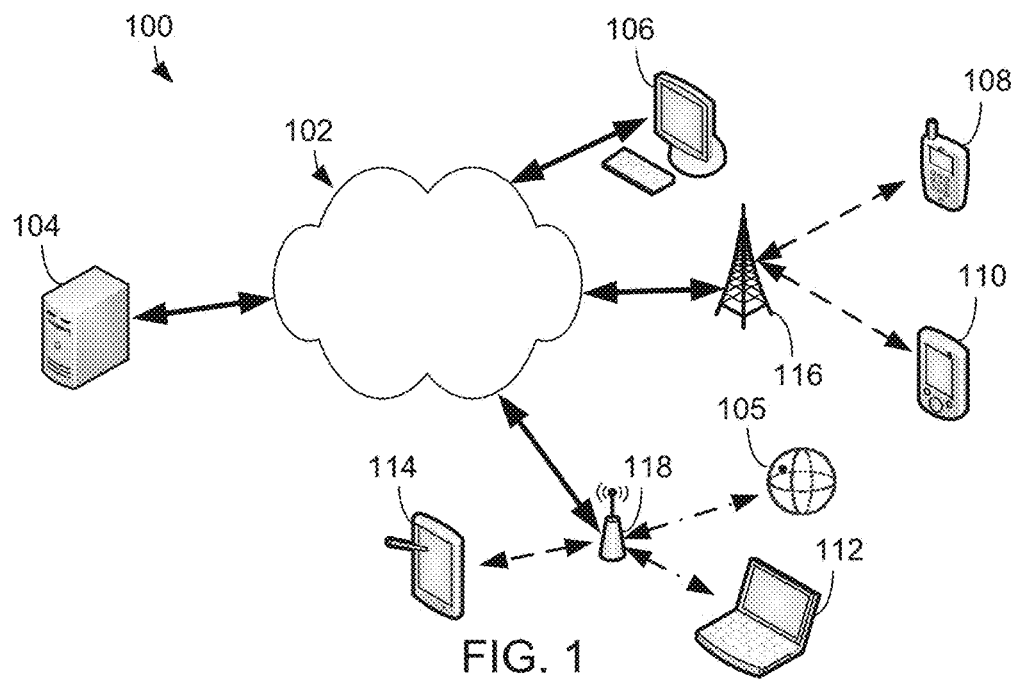
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least one server 104 and various client devices 105-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 105-114 represents any suitable computing or processing device that interacts with at least one server or other computing device(s) over the network 102. In this example, the client devices 105-114 include electronic devices, such as, for example, a robotic sensor ball 105, a desktop computer 106, a mobile telephone or smartphone 108, a personal digital assistant (PDA) 110, a laptop computer 112, a tablet computer 114, a media player, a media streaming device, etc. However, any other or additional client devices could be used in the communication system 100.

In this example, some client devices 105 and 108-114 communicate indirectly with the network 102. For example, the client devices 108-110 communicate via one or more base stations 116, such as cellular base stations or eNodeBs. Also, the client devices 105 and 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, robotic sensor ball 105 provides video and sensor monitoring of an environment and may provide information, for example, via server 104, to one or more of the other client devices 106-114. For example, this information may include streaming video, sensor data, etc. A user may be able to view this information and control movement and other actions of the robotic sensor ball 105 over network 102, via a peer to peer connection, and/or via a local area network connection.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
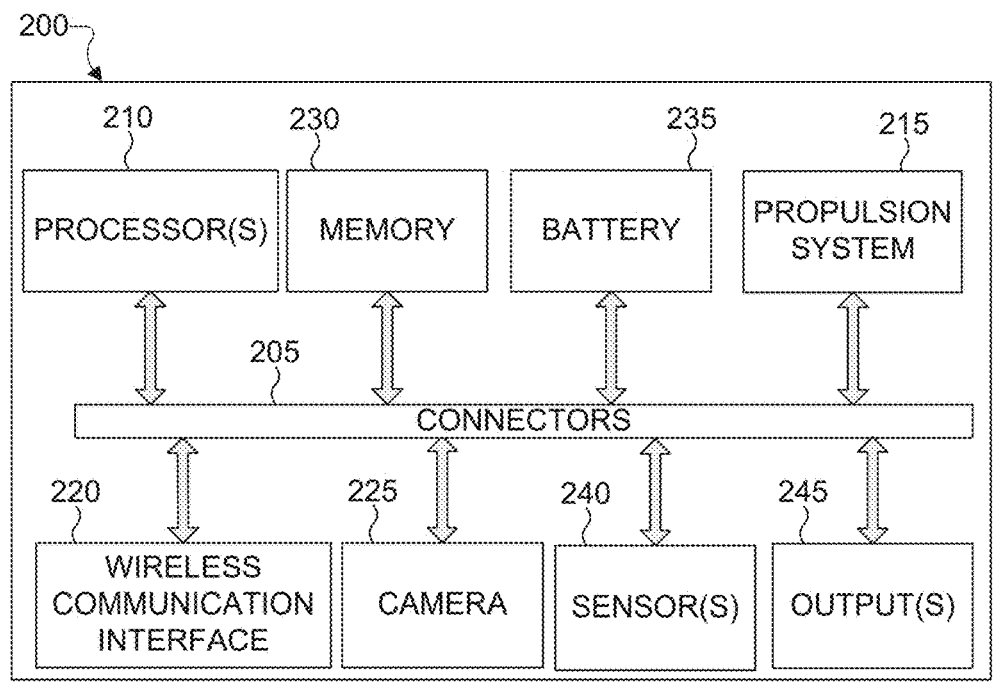
FIG. 2 illustrates a block diagram of components included in a robotic sensor ball in accordance with various embodiments of the present disclosure.
Figure 3A:
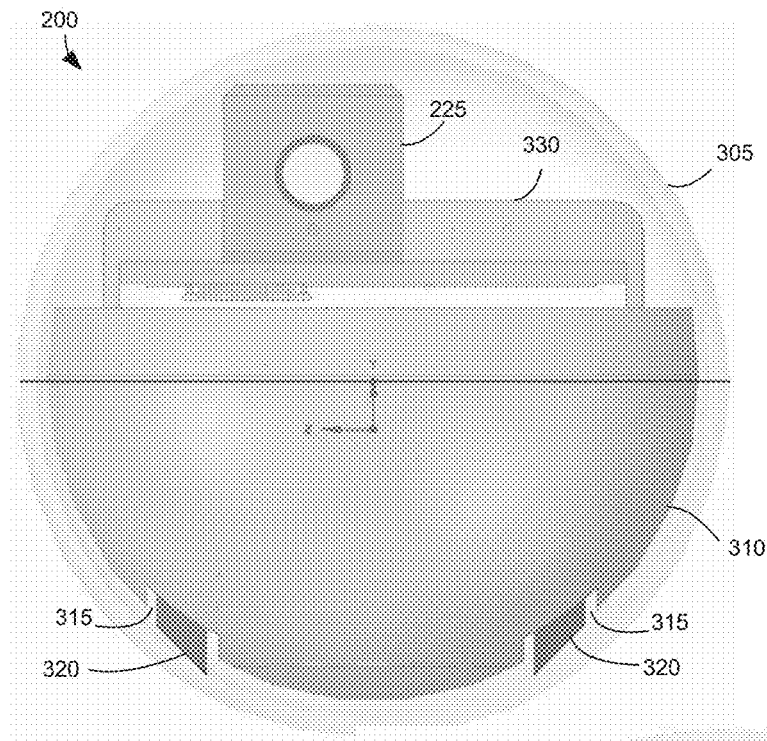
FIGS. 3A and 3B are front and side perspective views, respectively, illustrating a robotic sensor ball in accordance with various embodiments of the present disclosure.
Figure 3B:
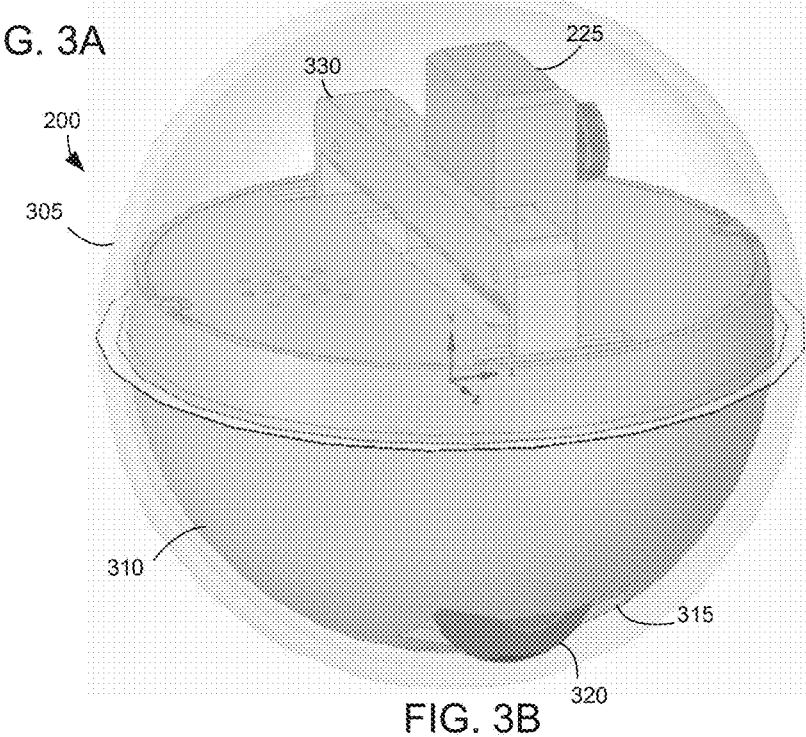

FIG. 2 illustrates a block diagram of components included in a robotic sensor ball 200 in accordance with various embodiments of the present disclosure. The robotic sensor ball 200 is an example of one implementation of robotic sensor ball 105 in FIG. 1. The embodiment of the robotic sensor ball 200 shown in FIG. 2 is for illustration only. Other embodiments of the robotic sensor ball 200 could be used without departing from the scope of the present disclosure.

As shown in FIG. 2, the components included in the robotic sensor ball 200 include a connectors 205, which supports connections and/or communication between at least one processor 210, a memory 230, a wireless communication interface 220, a battery 235, a camera 225, one or more sensors 240, and one or more outputs 245. For example, without limitation, the connectors 205 may be wires, a circuit board 340, a bus, a USB port 345, or any other suitable type of connector for providing an electrical connection between components in the robotic sensor ball 200.

The at least one processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor. Embedded software also runs on the processor 210 and to control the propulsion system 215 and collect the data from sensors 240 and stream data to cloud service or a user's device.

The memory 230 represents any structure(s) capable of storing and facilitating retrieval of information (such as data, program code, and/or other suitable information on a temporary or permanent basis). The memory 230 may represent a random access memory or any other suitable volatile or non-volatile storage device(s), including, for example, a read-only memory, hard drive, or Flash memory.

The wireless communication interface 220 supports communications with other systems or devices. For example, the wireless communication interface 220 could include a wireless transceiver facilitating communications over the network 102. The wireless communication interface 220 may support communications through any suitable wireless communication scheme including for example, Bluetooth, WiFi, and/or cellular communication schemes. In various embodiments, the processor 210, wireless communication interface 220, the memory 230 are referred to as control circuitry that controls various aspects and operations of the robotic sensor ball 200.

The propulsion system 215 provides rotational movement of the robotic sensor ball 200 in all directions. In one embodiment, the propulsion system 215 includes wheels and motor(s) that rotate the wheels within the robotic sensor ball 200, as discussed in greater detail below. In another embodiment, the propulsion system 215 is a robotic ball that uses internal rotation to produce motion.

The battery 235 provides power to the various components and may include one or more induction charging coils. For example, the battery 235 may include or be connected to an induction charging coil to charge battery wirelessly.

The camera 225 may be any type of camera as discussed in greater below. In some embodiments, one or more additional camera 225 may be included to face in different direction. For example, the robotic sensor ball 200 may have up to possibly 360 degree field of view if, for example, two or more cameras are used. For example, without limitation, the camera 225 may be a HD camera, a wide angle camera (e.g., to permit 190 degree angle of view), multiple angle cameras (e.g., to provide a 360 degree angle of view) an infrared camera, etc.

The sensor(s) 240 may include a various sensors as discussed in greater detail below. Example sensor(s) 240 include environmental monitoring and security sensors including, for example, without limitation, a microphone, an air quality sensor (e.g., smoke detector), a temperature sensor, a humidity sensor, localization sensors (e.g., using GPS, or Bluetooth low energy beacon signals), motion sensors (e.g., accelerometer, gyroscope, magnetometer), proximity sensors, etc.

The output(s) 245 provide feedback, control, and/or visual signals to persons and/or objects in proximity to the robotic sensor ball 200. For example, the output(s) 245 may sound alerts, display lights or video, or generate signals to wirelessly control external objects. Example type of output(s) 245 that can be included within the robotic sensor ball 200 include speaker(s), light(s), laser pointer(s), a video projector, a remote controller (e.g., such as an IR or RF remote controller), a display (e.g., LCD or LED display), etc. For example, the robotic sensor ball 200 may provide an alert via sounds or lights (e.g., dutiable or visual alerts) generated by the output(s) 245 when a certain condition is automatically recognized, at a certain time, or upon receipt of a request from the user application. In another example, the robotic sensor ball 200 can locate a projection surface (e.g., via image processing of the camera or based on mapped locations) and project an image or video onto the projection surface, for example, to enable video or image playback or video calling. In yet another example, the robotic sensor ball 200 can use a laser pointer for a user to remotely point to an object or entertain a pet. In another example, robotic sensor ball 200 can control objects in the environment (e.g., such as, a television, media player, thermostat, lights, curtains, etc.) via a IR or RF remote controller included one of the output(s) 245 of the robotic sensor ball 200. In yet another example, the robotic sensor ball 200 may display messages and/or at least limited graphics on a display mounted in the robotic sensor ball 200 as one of the output(s) 245.

FIGS. 3A-5 provide various views of illustrative embodiments of the robotic sensor ball 200 as well as components that may be included in the robotic sensor ball 200 in one or more embodiments of the present disclosure. The embodiments of the robotic sensor ball 200 shown in FIGS. 3A-5 are for illustration only. Other embodiments of the robotic sensor ball 200 could be used without departing from the scope of the present disclosure.

Figure 6A:
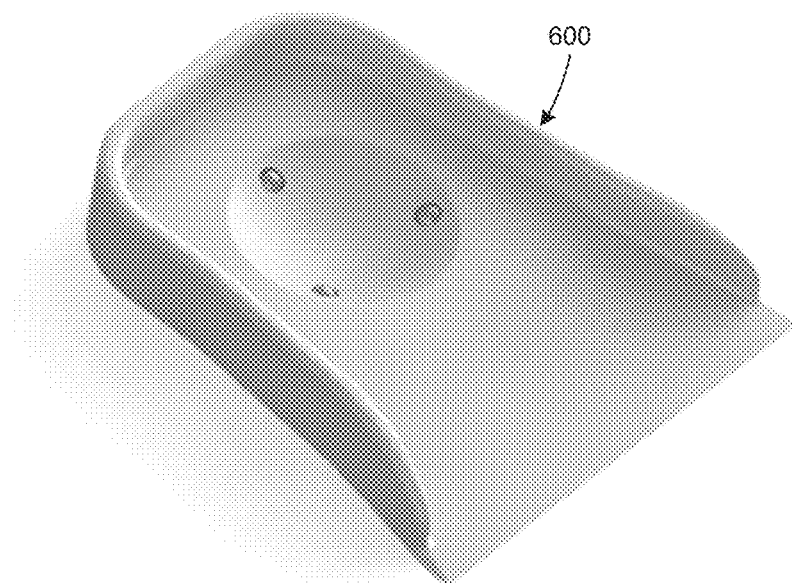
FIG. 6A illustrates an example charging platform in accordance with various embodiments of the present disclosure.
Figure 6B:
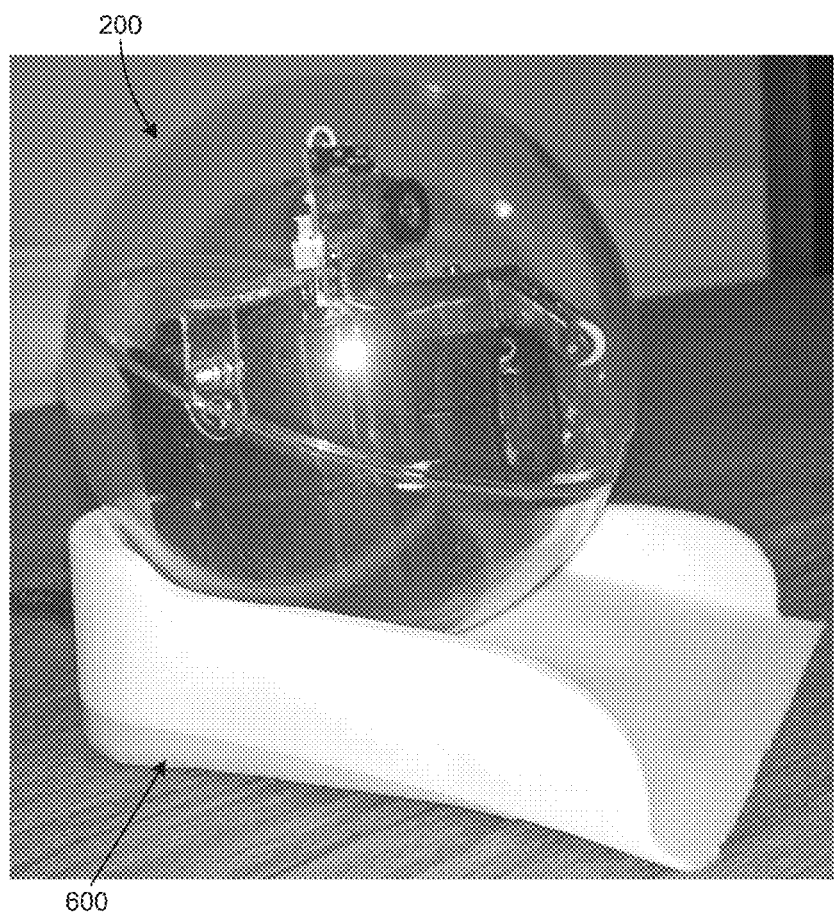
FIG. 6B illustrates the robotic sensor ball in a docked position on the charging platform illustrated in FIG. 6A in accordance with various embodiments of the present disclosure.

FIGS. 6A and 6B illustrate an example charging platform 600 and the robotic sensor ball 200 in a docked position on the charging platform 600, respectively, in accordance with various embodiments of the present disclosure. The embodiments of the charging platform 600 and the docking of the robotic sensor ball 200 shown in FIGS. 6A and 6B are for illustration only. Other embodiments of could be used without departing from the scope of the present disclosure.

In these illustrative embodiments, the robotic sensor ball 200 includes an outer shell 305 that provides a rigid exterior ball shape and an interior housing 310 that houses components of the robotic sensor ball 200. For example, the outer shell 305 may be made of a hard, durable plastic material and is composed of two or more separable pieces to permit addition or removal of components, such as, for example, sensor(s) 240, camera(s) 225, and outputs(s) 245. In these embodiments, at least a portion of the outer shell 305 or transparent to permit the camera 225 to view outside of the robotic sensor ball 200.

Figure 4A:
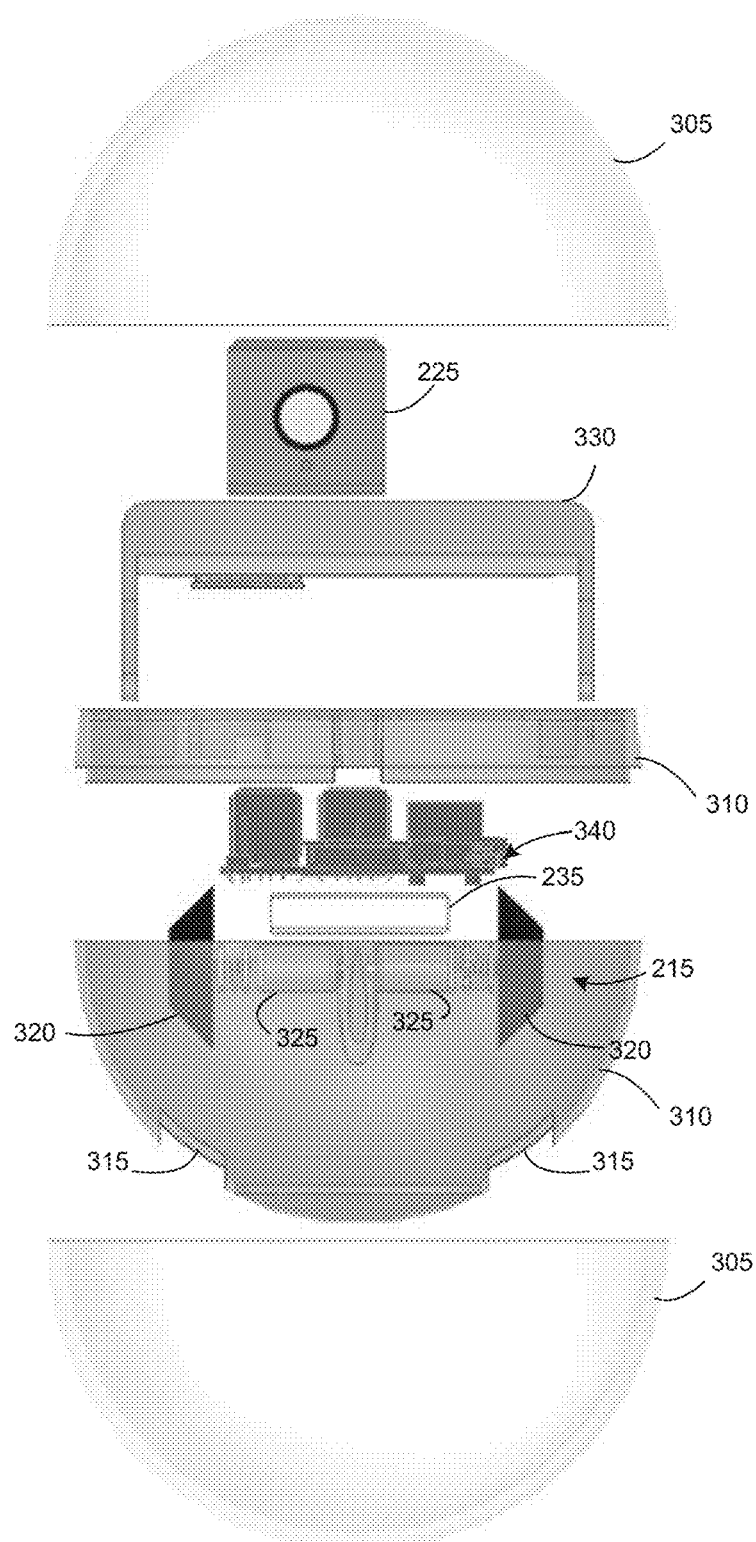
FIGS. 4A and 4B are front and side exploded views, respectively, illustrating various components included in a robotic sensor ball in accordance with various embodiments of the present disclosure.
Figure 4B:
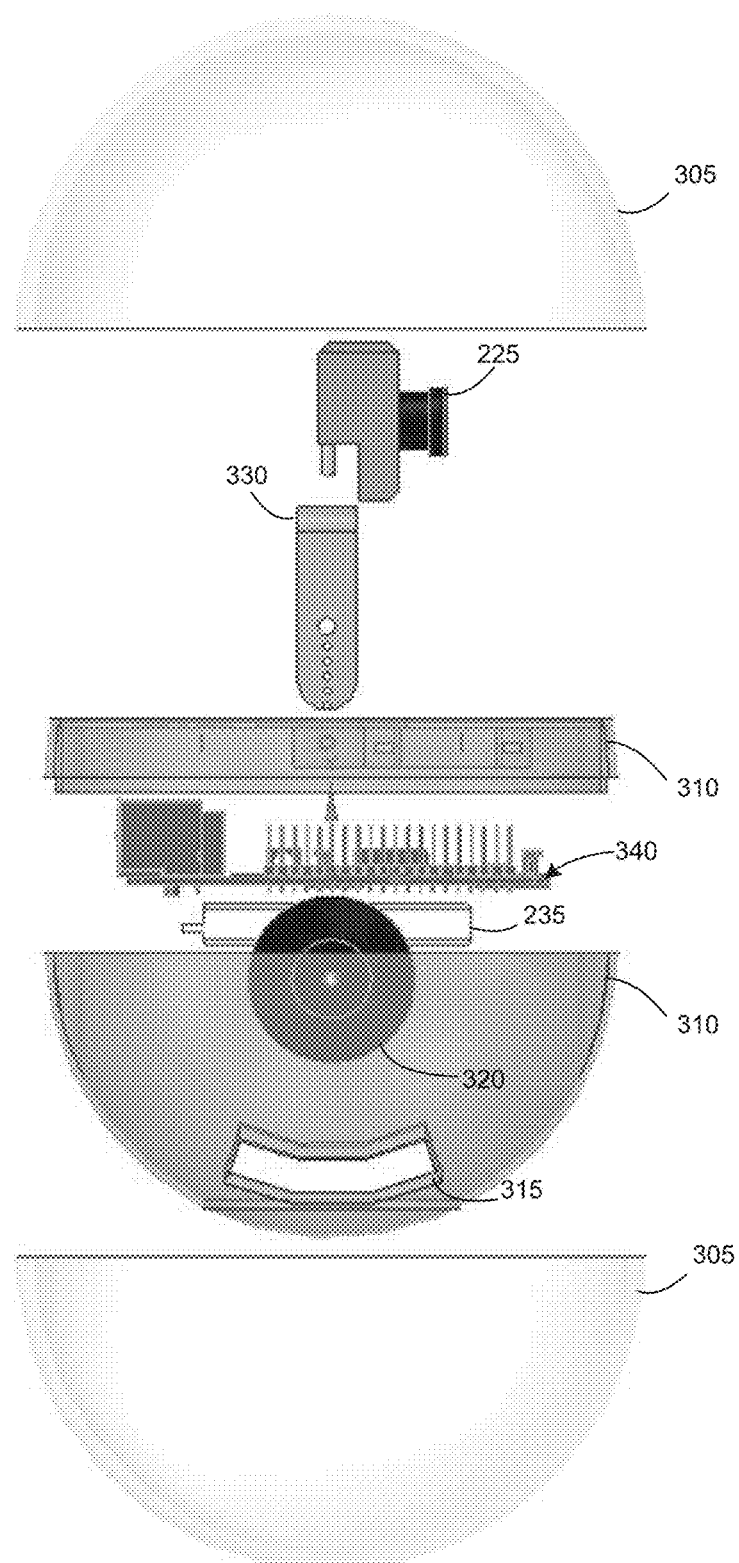
Figure 5:
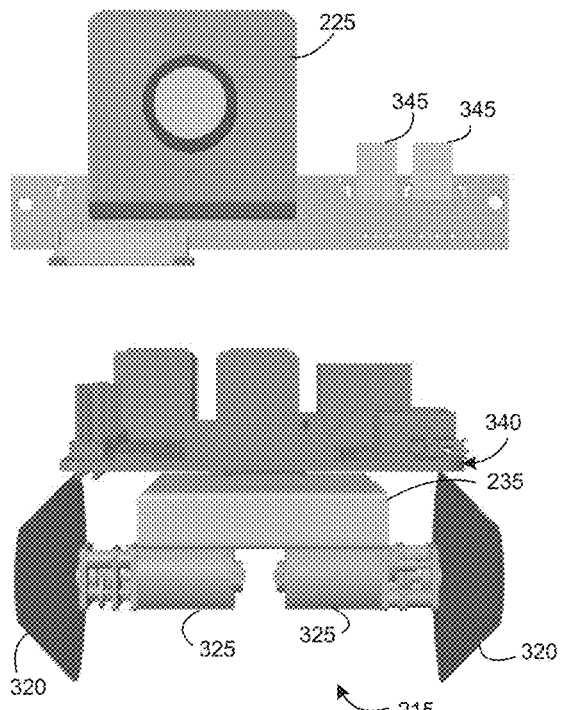
FIG. 5 illustrates the robotic sensor ball of FIG. 3A with housing and support structures removed to show components included in the robotic sensor ball in accordance with various embodiments of the present disclosure.

The housing 310 houses electronic components within the robotic sensor ball 200, for example, as illustrated in the exploded views of FIGS. 4A and 4B. The housing 310 includes openings 315 through which wheels 320 of the propulsion system 215 contact shell 305 to provide movement of the robotic sensor ball 200. The wheels 320 are rotated backwards and forwards by the motor(s) 325 of the propulsion system 215. For example, forward rotation of the wheels 320 causes the outer shell 305 and consequently the robotic sensor ball 200 to move forward, similarly backward rotation causes backward motion, and independent or opposite rotation of the wheels 320 causes the robotic sensor ball 200 to pan or turn. In some embodiments, the housing 310 may not be included in the robotic sensor ball 200 with the components exposed.

The housing 310 additionally includes a support 330 upon which the camera, as well as one or more additional sensors, outputs, and cameras can be mounted. The support 330 is a pivoted support, gimbal and/or stabilization bracket that allows for limited rotation of the camera 225 about a horizontal axis of the robotic sensor ball 200. For example, when moving using the wheels 320 and motor(s) 325, the position or viewing angle of the camera 225 relative to the horizontal axis of the ball may drop or rise depending on the direction (i.e., forwards or backwards) and speed of the robotic sensor ball 200. The rise or drop of the viewing angle may be undesirable to viewers of the video. Consequently, the robotic sensor ball 200 provides for at least mechanical stabilization of the camera 225 during movement to thereby to modify operation of the camera 225. For example, the robotic sensor ball 200 includes one or more gimbal or servo motors that in cooperation with one or more of the sensors 240 (e.g., accelerometer, gyroscope, magnetometer, etc.) adjust the angle and/or position of the camera 225 within robotic sensor ball 200 to provide or maintain a relatively constant horizontal view during movement. In another example, the robotic sensor ball 200 may adjust (e.g. pan) the viewing angle of the camera 225 to view objects that are located above or below the horizontal view point, for example, upon request from the user application or as part of performing an action. Additionally or alternatively, the robotic sensor ball 200 may utilize digital or software image/video stabilization to account for camera drop and rise as well as any other undesirable movement of the camera 225 during movement of the robotic sensor ball 200, for example, due to rotation over uneven surfaces.

As discussed above, the robotic sensor ball 200 can include a variety of sensor(s) 240, output(s) 245, and camera(s) 225 that can be added to or removed the robotic sensor ball 200 in a modular manner via connectors 205. For example, the environmental monitoring sensors in detachable and replaceable within the robotic sensor ball 200. As such, a user may add or remove any of the sensor(s) in the ball 200 and configure the arrangement and inclusion of the components included with the robotic sensor ball 200. The robotic sensor ball 200 is customizable and any combination of the above referenced example sensor(s) 240, output(s) 245, and camera(s) 225 may be added or removed as different modules to suit the intended monitoring purposes of the robotic sensor ball 200. For example, FIG. 5. illustrates connectors 205 in the form of USB ports 345. In this illustrative embodiment, the sensor(s) 240, output(s) 245, and/or camera(s) 225 can be modular with a USB port for easy electrical connection of the module(s) to the robotic sensor ball 200

For example, in some embodiments, the robotic sensor ball 200 may localize or triangulate its position using an indoor tracking system based on signals received from devices in known locations within an indoor environment. In one example, devices within a building may transmit Bluetooth low energy beacon signals with locational information and/or identification information of the transmitting device. The robotic sensor ball 200, via wireless communication interface 220 and processor 210, can identify its position relative to these devices based on localization methods including, for example, receive time and/or energy of the signals. In this manner, the robotic sensor ball 200 may utilize an indoor GPS system of coordinates to determine its location as well as use this location and/or coordinate information in mapping out interior spaces. For example, the memory 230 and/or the user application may generate maps of indoor spaces including passage ways and obstacles using this obtained location information.

The robotic sensor ball 200 is connected to a network such as the internet, for example, via Wi-Fi or cellular connections. A user can operate the ball remotely and provide criteria for alerts, triggers and/or notifications associated with conditions detected by the robotic sensor ball 200 for example, via an online account. In another example, the criteria for the criteria for alerts, triggers and/or notifications may be set up by default. If the sensors 240 on the robotic sensor ball 200 detect values that are beyond those set for alerts, triggers, or notifications, a cloud service, for example, provided by server 104 sends notifications or text messages to the user's device. The user can then connect to the robotic sensor ball 200 and streaming real-time video and or other sensor data (e.g., temperature, humidity, air quality sensor data, etc.).

In various embodiments, the robotic sensor ball 200 is a durable and water proof ball that can drive up to 4 miles per hour, travel in the water up to 2 miles per hour, and can absorb shocks of up to 4G. In various embodiments, the robotic sensor ball 200 is wirelessly controlled, for example, by the user via the inputs received by the wireless communication interface 220, to move the robotic sensor ball 200. In other examples, the robotic sensor ball 200 may utilize inputs received from the accelerometer, gyroscope, and/or magnetometer sensors to send ball orientation, movement speed and direction data to the user application in addition to environmental sensor data and video streaming data.

Figure 7:
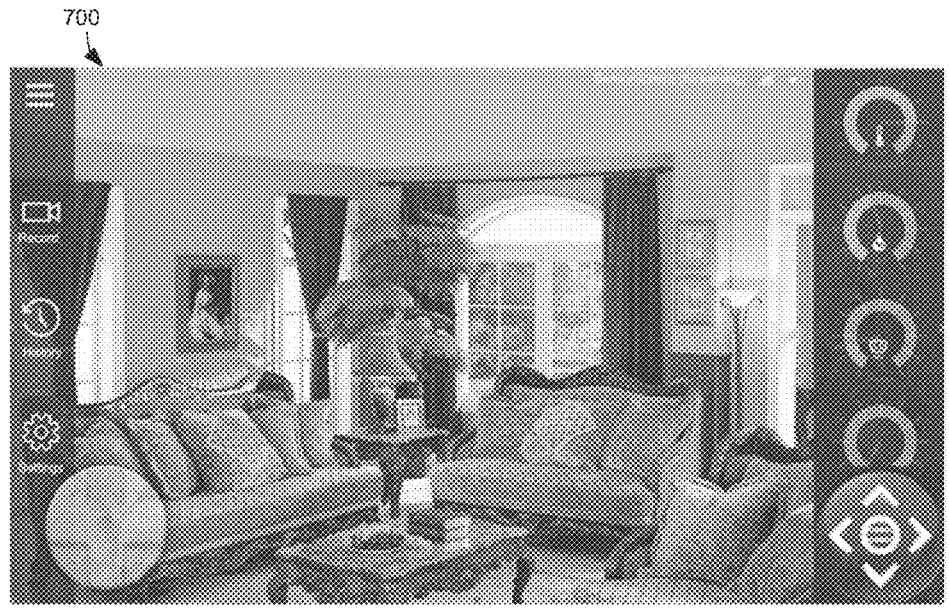
FIG. 7 illustrates an example view of a user interface for viewing and controlling a robotic sensor ball in accordance with various embodiments of the present disclosure.

FIG. 7 illustrates an example view of a user interface 700 for viewing and controlling a robotic sensor ball in accordance with various embodiments of the present disclosure. Embodiments of the present disclosure include an application that can run on multiple platforms including Windows 10, Android and IOS to drive and control the robotic ball, while streaming the data from ball back to the user interface on the user device. This application may be a web application or mobile application that communicates to the robotic sensor ball 200, via a cloud service, and the robotic sensor ball 200 is connected to cloud through a wireless network connection. The application is also capable of connecting and communication with the ball by directly pairing with the ball e.g., via a LAN Wi-Fi connection or peer to peer connection. The application can display real time environmental data along with a live video stream to the user via user interface 700 on the user's device as illustrated, for example, in FIG. 7. The user can also record all of the data and information. The application may also allow the user to manage account settings, including alerts and notifications for various conditions detected by the sensors on the robotic sensor ball 200.

In some embodiments, the user application provides a virtual reality (VR) view using the view of the robotic sensor ball 200. For example, the user device, such as one or more of client devices 106-114, may be a VR headset or a smartphone mountable within a VR headset. In these examples, the user application provides movement commands to the robotic sensor ball 200 based on an output of one or more motion sensors (e.g., a accelerometer, gyroscope, magnetometer, etc.) located on the user device or VR headset. For example, the user is enabled to control the view point of the camera 225 and the movement of the robotic sensor ball 200 with the user's head movement to thereby provide a VR view of a remote location.

In various embodiments, web services provide backend functionality to serve the web and mobile applications and embedded software. These services may be cloud hosted (e.g., via server 104) and include content delivery networks services along with a SQL server database on the backend for secure storage and retrieval of user data. Additionally, the web services provide learning algorithms to map out various locations and routes in the environment in which the ball 200 is deployed. For example, upon mapping, the robotic sensor ball 200 may execute routines or be provided with automated controls from the application to travel to a known location in the environment, for example, a room, a specific location within a room, or a specific view of objects in the environment (e.g., to monitor one or more objects periodically, randomly or upon request) In another example, upon mapping, the robotic sensor ball 200 may execute routines or be provided with automated controls from the application perform a specific function, such as a periodic travel through and video scan of various areas or an automated a return to charging platform 600, for example, when battery levels are low. In other examples, the learning allows the robotic sensor ball 200 to practice obstacle avoidance and of avoid running into walls when moving automatically or under user control. In another example, the ball 200 may recognize human faces for example to annotate video records, provide alerts when certain people are recognized, or to provide personal messages or alerts to a specific person (e.g., textually via the display panel or audibly via the speaker).

If the robotic sensor ball 200 is configured to connect with the cloud service, the user can configure alerts. For example, if any of the sensors data exceeds above threshold value or camera detects motion than the cloud service and web application can send a notification to a user's device to alert the user to access live streaming of data and/or drive the robotic sensor ball 200 around to investigate and/or get additional video/audio data along with other sensed environmental data.

In various embodiments, the robotic sensor ball 200 is programmed to provide alert(s) or perform specific action(s) upon detection of an event or sequence of events. For example, a user may train the robotic sensor ball 200 is programmed to provide alert(s) or perform specific action(s) upon detection of an sequence of events. In one example, upon the camera 225 viewing a specific person, animal, or object, the user may create a control setting for the robotic sensor ball 200 to perform some action, (e.g., send an alert to the user's mobile device, sound an audible alarm, play a message, turn on lights or music, etc.). In another example, based on a certain sequence of values detected by one or more of the sensor(s) 240 the user may create a control setting for the robotic sensor ball 200 to perform some action, (e.g., send an alert to the user's mobile device, sound an audible alarm, play a message, scan a room or set of rooms using video, etc.). In these examples, the robotic sensor ball 200 is trainable based on simulation and detection by the robotic sensor ball 200 of the triggering event or sequence of events. The user can then flag, via the user application, this event, sequence of events, or an event(s) within a threshold of the simulated and detected event(s) as a trigger for the action for the robotic sensor ball 200 to perform. In other examples, these triggered alerts or actions may be preprogrammed on the user application for standard events, for example, such as to turn on the camera and/or perform a room video scan in response to noise detection during periods of time when the indoor environment is supposed to be unoccupied in response to noise or motion detection, etc.

The cloud service also records video and audio streams along with sensors data within secure user's account, and recordings can be reviewed by user on devices. When the battery 235 is drained and needs charging, the robotic sensor ball 200 can be placed on, driven to, or automatically return to the charging platform 600 with the battery 235 facing downwards. Then, the charging platform 600 can the wirelessly charge the battery 235 via wireless charging coils included on the battery.

The user application enables a user to operate and receive data from the robotic ball. In various embodiments, a client device, such as one or more of client devices 106-114, displays a video stream from the camera patch of the robotic sensor ball 200. The user can control the movement of the robotic sensor ball 200 using a joystick on the screen of the user interface 700 for the application and can slide in any direction to drive the ball in that direction with additional movements to increase or decrease the speed of the ball and pan or zoom the camera, for example, via a second joystick on the screen of the user interface 700. The application, via one or more of client devices 106-114, provides in the user interface the associated data from the sensors included on the ball for example, temperature, humidity, air quality, etc. The application also allows the user to enable recording of the data along with the audio/video stream and access previously recorded data. The application also includes user configurable settings. For example, upon exceeding preset values the application may provide notifications and/or record data.

Figure 8:
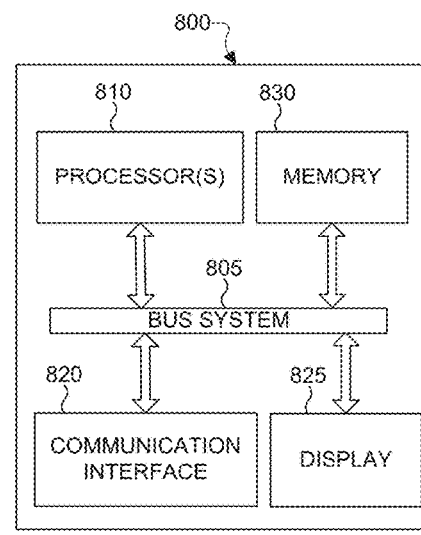
FIG. 8 illustrates an example client device 800 that may be used to implement control and display for the robotic sensor ball 200 according to various embodiments of the present disclosure.

FIG. 8 illustrates an example client device 800 that may be used to implement control and display for the robotic sensor ball 200 according to various embodiments of the present disclosure. In various embodiments, client device 800 runs the user application to provide the user interface 700 to view video signals and monitor data from the robotic sensor ball 200 as well as receive control inputs which are processed by the client device 800 and sent to the robotic sensor ball 200 to control operation of the robotic sensor ball 200. For example, client device 800 may be one or more of the client devices 106-114. As shown in FIG. 8, the client device 800 includes a bus system 805, which supports communication between at least one processor 810, a memory 830, at least one communications interface 820, and a display 825.

The processor 810 executes instructions that may be loaded into a memory 830. The processor 810 may include any suitable number(s) and type(s) of processors or other devices in any suitable arrangement. Example types of processor 810 include microprocessors, microcontrollers, digital signal processors, field programmable gate arrays, application specific integrated circuits, and discreet circuitry.

The memory 830 represents any structure(s) capable of storing and facilitating retrieval of information (such as data, program code, and/or other suitable information on a temporary or permanent basis). The memory 830 may represent a random access memory or any other suitable volatile or non-volatile storage device(s). For example, memory 830 may also contain one or more components or devices supporting longer-term storage of data, such as a read-only memory, hard drive, Flash memory, or optical disc.

The communications interface 820 supports communications with other systems or devices. For example, the communications interface 820 could include a network interface card or a wireless transceiver (e.g., satellite, cellular, WiFi, Bluetooth, NFC, etc.) facilitating communications over the network 102. The communications interface 820 may support communications through any suitable physical or wireless communication link(s). The communications interface 820 may include only one or both of a transmitter and receiver.

The display 825 can be a liquid crystal display or other display capable of rendering text and/or graphics, such as, for example, video signals and monitor data from the robotic sensor ball 200. The display 825 may also include a touchscreen for providing touch based controls (e.g., via a virtual joystick as shown in FIG. 7) of the robotic sensor ball 200.

Embodiments of the present disclosure provide a robotic sensor ball that is modular to provide customizable environment sensing. Embodiments of the present disclosure utilize video and data processing to provide a seamless information to users and controls for the user to obtain desired information. Embodiments of the present disclosure further include learning techniques to improve and simplify user experience.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

What is claimed is:

1. An apparatus comprising:
an outer shell forming a ball;
control circuitry positioned within the outer shell, the control circuitry comprising at least one processor, memory, and a wireless communication interface;
a camera operably connected to the control circuitry, the camera configured to generate video signals of a view exterior to the outer shell;
a motion sensor positioned within the outer shell, operably connected to the control circuitry and configured to detect motion of the apparatus;
a propulsion system inside the outer shell, the propulsion system configured to cause the outer shell to rotate in response to instructions received via the wireless communication interface; and
one or more connectors configured to operably connect one or more sensors to the control circuitry, the one or more sensors connectable in a modular manner;
wherein the control circuitry is configured to apply digital video stabilization based on motion of the apparatus detected by the motion sensor, and
wherein the at least one processor is configured to:
identify obstacles in an indoor environment based on the video signals generated by the camera and outputs of at least some of the one or more sensors while the apparatus is moving in the indoor environment,
generate a map of the indoor environment based on the identified obstacles and an indoor system of coordinates, and
control movement of the apparatus within the indoor environment based on the generated map.

2. The apparatus of claim 1, wherein the motion sensor is operably connected to the control circuitry via at least one of the one or more connectors, and
wherein the control circuitry is configured to apply the digital video stabilization to account for horizontal or vertical movement of the camera during movement of the apparatus.

3. The apparatus of claim 2, further comprising:
a housing within the outer shell, the housing containing at least the control circuitry; and
a support positioned within the outer shell and rotatably connected to the housing, the support rotatable in at least one axis,
wherein the control circuitry is configured to apply the digital video stabilization using software video stabilization.

4. The apparatus of claim 1, further comprising:
a housing within the outer shell, the housing containing at least the control circuitry and having ports for connecting additional sensors, wherein the outer shell is formed of at least two separable pieces and at least a portion of the outer shell is transparent.

5. The apparatus of claim 1, wherein the camera is a wide angle camera configured to provide at least a 180 degree field of view.

6. The apparatus of claim 1, wherein:
the wireless communication interface is configured to receive a request to travel to a specific location within the indoor environment, and
the at least one processor is configured to generate the map of the indoor environment by triangulating a position of the apparatus in the map relative to the identified obstacles and the indoor system of coordinates;
the at least one processor is configured to identify the specific location within the indoor environment using the mapping of the indoor environment and control the propulsion system to move the apparatus to the identified specific location within the indoor environment, the propulsion system including at least one wheel configured to move the apparatus and a motor configured to drive the at least one wheel;
the at least one processor is configured to perform the mapping using embedded software on the apparatus; and
the at least one processor is configured to control the movement of the apparatus within the indoor environment based on the generated map and the triangulated position of the apparatus.

7. The apparatus of claim 1, wherein:
the wireless communication interface is configured to receive beacon signals from objects within the indoor environment, and
the at least one processor is configured to identify a location of the apparatus within the indoor environment based on correlating the beacon signals with the mapping of the indoor environment.

8. The apparatus of claim 1, wherein the at least one processor is configured to:
identify an occurrence of an event or sequence of events; and
control the apparatus to perform an action in response to identification of the occurrence of the event or sequence of events.

9. The apparatus of claim 8, wherein:
the occurrence of an event or sequence of events comprises recognition of a specific person or object in the video signals generated by the camera, and
the action comprises at least one of generating an audible or visual alert by the apparatus, sending a notification to an external device via the apparatus, and generating control signals to control another device in an indoor environment in which the apparatus is located.

10. The apparatus of claim 8, wherein:
the occurrence of an event or sequence of events comprises values of one or more of the one or more sensors reaching a threshold,
the action comprises at least one of generating an audible or visual alert by the apparatus, sending a notification to an external device via the apparatus, moving throughout an indoor environment to perform a video scan of the indoor environment, and moving to a charging platform in the indoor environment, and
the apparatus comprises a battery configured to receive a wireless charge from the charging platform.

11. A method for operating a robotic sensor ball, the method comprising:
identifying, using control circuitry of the robotic sensor ball, obstacles in an indoor environment based on video signals generated by a camera and outputs one or more sensors while the robotic sensor ball is moving in the indoor environment, wherein the camera and the one or more sensors are operably connected to the control circuitry of the robotic sensor ball, wherein the robotic sensor ball includes a motion sensor, and wherein the control circuitry comprises at least one processor, memory, and a wireless communication interface, and wherein the control circuitry is positioned within an outer shell of the robotic sensor ball;
applying digital video stabilization based on motion of the robotic sensor ball detected by the motion sensor;
moving the robotic sensor ball by causing, by a propulsion system inside the outer shell, the outer shell to rotate in response to instructions received via the wireless communication interface;
generating a map of the indoor environment based on the identified obstacles and an indoor system of coordinates; and
controlling movement of the robotic sensor ball within the indoor environment based on the generated map.

12. The method of claim 11, further comprising:
receiving, via the wireless communication interface, a request to travel to a specific location within the indoor environment;
identifying the specific location within the indoor environment using the mapping of the indoor environment; and
moving, by the propulsion system, the robotic sensor ball to the identified specific location within the indoor environment, the propulsion system including at least one wheel configured to move the robotic sensor ball and a motor configured to drive the at least one wheel;
wherein:
the mapping of the indoor environment is generated by triangulating a position of the robotic sensor ball in the map relative to the identified obstacles and the indoor system of coordinates,
the mapping is generated using embedded software on the robotic sensor ball, and
the movement of the robotic sensor ball within the indoor environment is based on the generated map and the triangulated position of the robotic sensor ball.

13. The method of claim 11, further comprising:
receiving, via the wireless communication interface, beacon signals from objects within the indoor environment; and identifying, by the at least one processor, a location of the robotic sensor ball within the indoor environment based on correlating the beacon signals with the mapping of the indoor environment, wherein:
applying the digital video stabilization comprises applying the digital video stabilization to account for vertical or horizontal movement of the camera during movement of the robotic sensor ball using software video stabilization.

14. The method of claim 11, further comprising:
identifying an occurrence of an event or sequence of events, wherein the occurrence of an event or sequence of events comprises recognition of a specific person or object in the video signals generated by the camera, and
controlling the robotic sensor ball to perform an action in response to identification of the occurrence of the event or sequence of events, wherein the action comprises at least one of generating an audible or visual alert by the robotic sensor ball, sending a notification to an external device via the robotic sensor ball, and generating control signals to control another device in an indoor environment in which the robotic sensor ball is located.

15. The method of claim 11, further comprising:
identifying an occurrence of an event or sequence of events, wherein the occurrence of an event or sequence of events comprises values of one or more of the one or more sensors reaching a threshold, and
controlling the robotic sensor ball to perform an action in response to identification of the occurrence of the event or sequence of events, wherein the action comprises at least one of generating an audible or visual alert by the robotic sensor ball, sending a notification to an external device via the robotic sensor ball, moving throughout an indoor environment to perform a video scan of the indoor environment, and moving to a charging platform in the indoor environment.

16. A robotic sensor ball comprising:
an outer shell forming a ball;
control circuitry positioned within the outer shell, the control circuitry comprising at least one processor, memory, and a wireless communication interface;
a camera operably connected to the control circuitry, the camera configured to generate video signals of a view exterior to the outer shell;
a motion sensor positioned within the outer shell, operably connected to the control circuitry, and configured to detect motion of the robotic sensor ball;
a propulsion system inside the outer shell, the propulsion system configured to cause the outer shell to rotate; and
one or more sensors operably connected to the control circuitry, at least some of the one or more sensors connectable in a modular manner,
wherein the control circuitry is configured to apply digital video stabilization based on motion of the robotic sensor ball detected by the motion sensor,
wherein the at least one processor is configured to:
identify obstacles in an indoor environment based on the video signals generated by the camera and outputs of at least some of the one or more sensors while the robotic sensor ball is moving in the indoor environment,
generate a map of the indoor environment based on the identified obstacles and an indoor system of coordinates,
control movement of the robotic sensor ball within the indoor environment based on the generated map, identify an occurrence of an event or sequence of events, and control the robotic sensor ball to perform an action in response to identification of the occurrence of the event or sequence of events.

17. The robotic sensor ball of claim 16, wherein:

the wireless communication interface is configured to receive a request to travel to a specific location within the indoor environment;

the at least one processor is configured to generate the map of the indoor environment by triangulating a position of the robotic sensor ball in the map relative to the identified obstacles and the indoor system of coordinates;

the at least one processor is configured to identify the specific location within the indoor environment using the mapping of the indoor environment and control the propulsion system to move the robotic sensor ball to the identified specific location within the indoor environment, the propulsion system including at least one wheel configured to move the robotic sensor ball and a motor configured to drive the at least one wheel; and the at least one processor is configured to control the movement of the robotic sensor ball within the indoor environment based on the generated map and the triangulated position of the robotic sensor ball.

18. The robotic sensor ball of claim 16, further comprising:

a housing within the outer shell, the housing containing at least the control circuitry and having ports for connecting additional sensors;

wherein:

the control circuitry is configured to apply the digital video stabilization to account for vertical or horizontal movement of the camera during movement of the robotic sensor ball, the control circuitry is configured to apply the digital video stabilization using software video stabilization, and the outer shell is formed of at least two separable pieces and at least a portion of the outer shell is transparent.

19. The robotic sensor ball of claim 16, wherein:

the occurrence of an event or sequence of events comprises recognition of a specific person or object in the video signals generated by the camera, and the action comprises at least one of generating an audible or visual alert by the robotic sensor ball, sending a notification to an external device via the robotic sensor ball, and generating control signals to control another device in an indoor environment in which the robotic sensor ball is located.

20. The robotic sensor ball of claim 16, wherein:

the occurrence of an event or sequence of events comprises values of one or more of the one or more sensors reaching a threshold, and the action comprises at least one of generating an audible or visual alert by the robotic sensor ball, sending a notification to an external device via the robotic sensor ball, moving throughout an indoor environment to perform a video scan of the indoor environment, and moving to a charging platform in the indoor environment.

* * * * *